(12) United States Patent
Zhao et al.

(10) Patent No.: US 8,185,530 B2
(45) Date of Patent: May 22, 2012

(54) METHOD AND SYSTEM FOR WEB DOCUMENT CLUSTERING

(75) Inventors: Yu Zhao, Beijing (CN); Jianqiang Li, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 397 days.

(21) Appl. No.: 12/208,644

(22) Filed: Sep. 11, 2008

(65) Prior Publication Data

US 2009/0070366 A1 Mar. 12, 2009

(30) Foreign Application Priority Data

Sep. 12, 2007 (CN) .......................... 2007 1 0149567

(51) Int. Cl.
*G06F 17/30* (2006.01)

(52) U.S. Cl. ....................................... 707/737; 707/755

(58) Field of Classification Search .................. 707/711, 707/737, 755, 830, 754, 999.102; 715/206
See application file for complete search history.

(56) References Cited

U.S. PATENT DOCUMENTS

| | | | | |
|---|---|---|---|---|
| 6,895,551 | B1 * | 5/2005 | Huang et al. | 715/205 |
| 7,865,502 | B2 * | 1/2011 | Balmin et al. | 707/713 |
| 2005/0222989 | A1 * | 10/2005 | Haveliwala et al. | 707/3 |
| 2008/0134015 | A1 * | 6/2008 | Milic-Frayling et al. | 715/206 |

FOREIGN PATENT DOCUMENTS

JP       2003-248692 A       9/2003

OTHER PUBLICATIONS

Harada, E. et., al. "Estimation of Hierarchical Structure of Web for Search Engine", IPSJ SIG Notes, May 17, 1999, vol. 99, No. 39, pp. 2-11.

* cited by examiner

*Primary Examiner* — Marc Filipczyk
(74) *Attorney, Agent, or Firm* — Sughrue Mion, PLLC (57) ABSTRACT

Method and system for web documents clustering are provided. The method for web documents clustering includes: inputting a plurality of web documents, collecting information of the links and the directory structure of the inputted web documents, extracting, according to the collected links and directory structure, a hierarchical structure for the plurality of web documents and generating and outputting, based on the extracted hierarchical structure, one or more clusters of the plurality of web documents.

20 Claims, 7 Drawing Sheets

METHOD AND SYSTEM FOR WEB DOCUMENT CLUSTERING

FIELD OF THE INVENTION

This invention relates to web information extraction and mining technology, and more particularly, to provide a method and system for web document clustering.

BACKGROUND

At present, World Wide Web (WWW) has become a popular and important medium to disseminate and acquire information, which is of huge amount, diverse, heterogeneous, distribute and other features, and much of information is implicit. Web information extraction and mining technology is important to help people to utilize the maximum of the web and information. In fact, web information extraction and mining has already turned out to be a hot research area, and even the applications and products based on these technologies have been also popular in the market.

Document clustering is a kind of general information mining technology, which is used for exploiting the similarities and relationships among documents. The purpose of document clustering is to organize the documents into several meaningful groups so that the documents within the same group have high similarities or strong relations, while documents belonging to the different groups are far from each other. The grouping process is automatic and without pre-defined groups. Clustering results are organized document sets, so document clustering is widely used to increase the efficiency and effectiveness of the information retrieval and other information extraction systems, and also used to organize the retrieval results for browsing conveniently. Because of the large amounts of web information, clustering plays more particularly important role in enabling efficient and accurate information extraction in the web domain.

The goal of web document clustering is to automatically divide the pre-selected web document set into several meaningful groups, which are not pre-defined, and to guarantee that the similarities or relations of the documents in the same group are much stronger than those of the documents in different groups. On the other hand, because the similarities and relations can be defined differently by different measurement standards, different cluster analysis results may be obtained for the same document set from different aspects. For example, the clustering can be used to group some product-related web pages of company website into news pages, advertisement pages, shopping pages, etc according to content type, or to group them according to product categories into several product clusters, i.e. a cluster represents all the pages about the same product. Thus, the general problem of web document clustering is how to design an appropriate clustering method to meet the practical requirement accurately and efficiently.

In the technical view, the primary process for designing a document clustering method is firstly to select proper and efficient document features for specific clustering purpose and then to model clustering mechanisms based on the documents features. So, we review the existing technical solutions from these two aspects.

From the aspect of the feature selection, the existing solutions for web document clustering can be generally divided into the following four categories which consider different kinds of features for clustering: (1) document content based clustering; (2) hyperlink information based (context based) clustering; (3) web usage information based clustering; (4) hybrid clustering. In the traditional document clustering solutions, the most common one is the document clustering methods by content-related features, i.e. the textual information within the documents. For web document clustering, the content-related features include not only textual information of the content, but also the HTML structure of the web pages. Furthermore, since the hyperlink is the primary feature of the web, the importance of link-related information is the same as, or even more than content-related information for web document clustering. Therefore, the document clustering based on hyperlink information is more and more popular. Also, because the web users' usage information, such as browsing history, browsing paths and so on, can be recorded, some solutions use this kind of usage information to assess the relationship among web documents. Certainly, for general cases, the information is not much enough if considering only web document contents, because many web pages include little textual information and have irregular HTML structure. And on the other hand, the information is not meaningful enough if considering only hyperlink information or web usage information, because many links and browsing are random and subjective. Thus, the hybrid solutions are usually designed for general web document clustering.

From the aspect of clustering mechanism modeling, almost all the existing solutions are based on peer-to-peer similarity analysis models. In more details, these solutions design some algorithms to analyze the similarities (usually represented by similarity scores) between each pair of documents directly or indirectly, and then cluster the documents according to the results, i.e., the group, every two documents of which have high similarities, becomes a cluster. The concrete model for similarity analysis is either set by rules or from machine learning.

Several representative technical solutions in the prior art are introduced as follows.

In non-patent document [1] (V. Crescenzi, P. Merialdo, P. Missier. Clustering web pages based on their structure. Data & Knowledge Engineering 54 (2005) 279-299), the solution is given to cluster pages from a data intensive website with the analysis of link collection (a set of links with the same layout and presentation properties in one page) and page document object model (DOM) structure. The entry point to the site is a single seed page, which becomes the first member of the first class, the link collections of the seed page are extracted and pushed into a priority queue. Then, following steps are iterated until the queue is empty: One of the link collections from the queue is selected and a subset of the pages pointed to by its links is fetched. The fetched pages are clustered according to their page structure similarity (which is defined with respect to their DOM trees). Minimum Description Length (MDL) principle is adopted to determine whether each candidate class is a new class to be added to the model, or it should be merged with an existing class.

In non-patent document [2] (X. He, H. Zha, C. H. Q. Ding, etc. Web document clustering using hyperlink structures. Computational Statistics & Data Analysis 41 (2002): 19-45), the basic feature for web page clustering is the hyperlink structure, and also the textual information and co-citation information are combined inside. The kernel idea for clustering is that those pages, which are more inter-linked together, are more similar, the clustering problem is transformed into link graph partitioning problem. The similarity weight from link structure is adjusted by textual information similarity information, and is enhanced if two pages are co-cited.

Furthermore, Japanese Patent document [3], i.e. [JP2004-341942] clusters the web documents by analyzing the similarities of each pair of documents with comparing their respective domain name, directory name, file name, which are retrieved from their URLs.

In order to better understand the present invention, the disclosures of the above-mentioned documents are hereby incorporated entirely by reference for all purposes.

However, there are some still unaddressed problems with the existing solutions. At first, with respect to the non-patent document [1], the method can cluster the pages only for restrict data intensive websites. Nevertheless, for the websites with even a little dirty structure, it would not be applicable, because the structural similarity can't imply the topic or content similarity in non-restrict data intensive situation. Thus, this method is too specific and the accuracy of this method in a general view can't be obtained. And for the non-patent document [2], the solution uses learning-based clustering algorithms, such that the collection and tagging for sample corpus manually is still the bottleneck for limit of the efficiency. Also the results are biased by the sample corpus and this clustering method is too general to guarantee enough accuracy for specific situations. Furthermore, the Patent document [JP2004-341942] is too limited to handle the usual situations because most URLs are not normative and meaningful for the great mass of websites, especially for those dynamic websites with parameter-based URLs. Thus, based on the observation above, we can find that the deficiencies on the accuracy and efficiency are still the common disadvantage of the existing solutions.

On the other hand, for the efficiency need of clustering, there's another unaddressed problem of the existing solutions. Because the existing solutions are all based on peer-to-peer similarity analysis, the result clusters have only flat structure, i.e., there are no relations among different clusters except that the documents in different clusters are much less similar than the documents within the same cluster. Thus, the clustering result can only reflect the similarities of the documents from a single aspect or a single level, and it would take much work to modify the features and models of clustering in order to transfer the similarity aspect or level. For example, for a clustering analysis of product pages within a company website, we can group the pages by different products, i.e. a cluster represents an individual product, or also can we group the pages by different product category, i.e. a cluster represents a product category. The second clustering goal has the higher similarity level than the first one, and they can be hierarchical related. But the existing solutions can't achieve the two clustering results at the same time, and although can the results be got successively, they can't be related together automatically and then the clustering methods are lack of efficiency in the whole view.

SUMMARY OF THE INVENTION

In view of the low accuracy and efficiency of the clustering methods in the prior art, the present invention is made.

According to one aspect of the present invention, it is provided a method for web documents clustering, which comprises: inputting a plurality of web documents; collecting information of the hyperlinks and the directory structure of the inputted web documents; extracting, according to the collected hyperlinks and directory structure, a hierarchical structure for the plurality of web documents; and generating and outputting, based on the extracted hierarchical structure, one or more clusters of the plurality of web documents.

According to another aspect of the present invention, it is provided a system for web documents clustering, which comprises: an inputting means for inputting a plurality of web documents; a collecting means for collecting information of the hyperlinks and the directory structure of the inputted web documents; an extracting means for extracting, according to the collected hyperlinks and directory structure, a hierarchical structure for the plurality of web documents; and an outputting means for generating and outputting, based on the extracted hierarchical structure, one or more clusters of the plurality of web documents.

Within the basic embodiment of this invention, similar with the prior arts, it selects the hyperlink relations among the web pages within a website to serve as the basic feature for web document clustering. However, different from the prior art, the present invention utilizes the hyperlink relations to mine and extract the hierarchy (ancestor-descendant) structure of the web document set to realize the clustering. In the mean time, with respect to the extraction of the hierarchical ancestor-descendant structure, the present invention adopts an algorithm for analysis based on the hyperlink relations, in particular, the following algorithm: extracting the hierarchical ancestor-descendant relationships among the web pages, based on comparing the inbound and outbound link sets between each pair of documents; and then if these documents have domain directory structure, the directory structure is glued directly to the analysis result based on the hyperlink relations to obtain the final hierarchical structure. In an embodiment, the generated hierarchical structure is a document tree. The document tree is then used for documents clustering. In the document tree, each document, with any tree depth, composes a cluster with its descendants together. Therefore, the hierarchical relationships among clusters are accordant to the relationships of the nodes on the whole document tree. In a word, the clustering method according to the present invention not only does clustering but also gets the hierarchical relationships among clusters automatically.

Furthermore, considering that the present invention utilizes the including relationships between in-bound and out-bound link sets as feature to perform the documents clustering, it can reduce the disturbance of the random or non-meaningful hyper-link information, so that it can improve the accuracy of the clustering results greatly. On the other hand, the usage of the feature is not learning-based but simple rule-based, so that the satisfactory efficiency can be obtained.

As described above, since the clustering results according to the present invention include not only clusters but also the hierarchical relations between clusters additionally, this method can get the clustering results of different similarity levels at the same time, and they are co-related. Thus it improves the efficiency on the whole.

Furthermore, as an additional and optional result, the hierarchical structure of the document set (i.e. the document tree) generated according to the present invention can be used for realizing other web information extraction tasks.

The foregoing and other features and advantages of the present invention can become more obvious from the following description in combination with the accompanying drawings. Please note that the scope of the present invention is not limited to the examples or specific embodiments described herein.

BRIEF DESCRIPTIONS OF THE DRAWINGS

The foregoing and other features of this invention may be more fully understandable from the following description, when reading together with the accompanying drawings in which.

DETAILED DESCRIPTION OF THE PREFERRED EMBODIMENTS

Below the exemplified embodiments of the present invention will be described with reference to the accompanying drawings. It should be noted that the described embodiments are only used for the purpose of illustration, and the present invention is not limited to any of the specific embodiments described herein.

Figure 1:
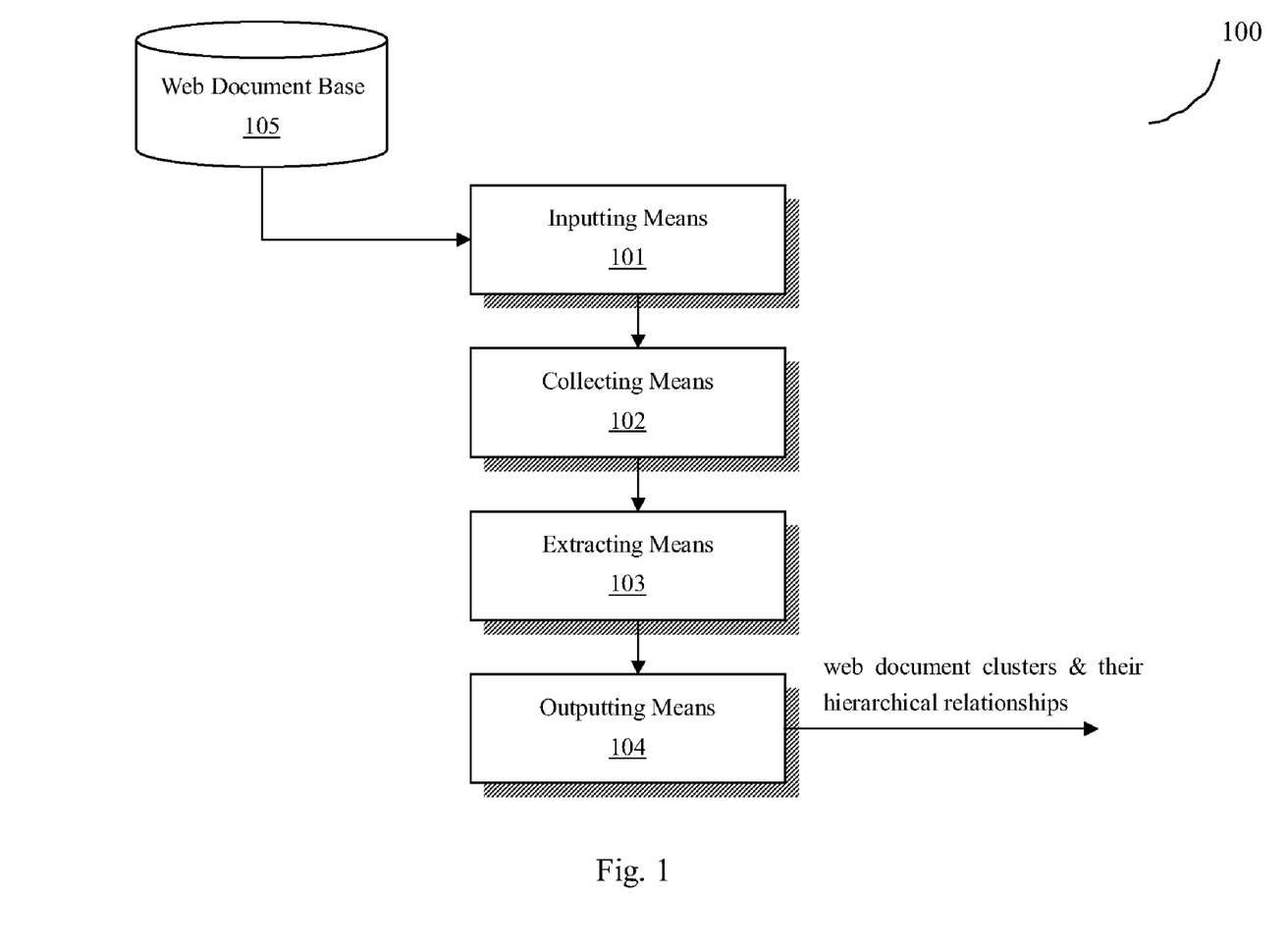
FIG. 1 is a block diagram for illustrating the web document clustering system 100 according to a first embodiment of the present invention.

FIG. 1 is a block diagram for illustrating the web document clustering system 100 according to a first embodiment of the present invention. As shown, the system 100 includes an inputting means 101, a collecting means 102, an extracting means 103, a outputting means 104 and a web document base 105. The system 100 acquires a plurality of web documents from the web document base 105 using the inputting means 101, and after a series of processes, the outputting means 104 outputs the resulted clusters for the web documents and the hierarchical relations among respective clusters. The web document base 105 can store a collection of the web documents obtained from the network through a web crawler & web pages parsing module (not shown).

Figure 2:
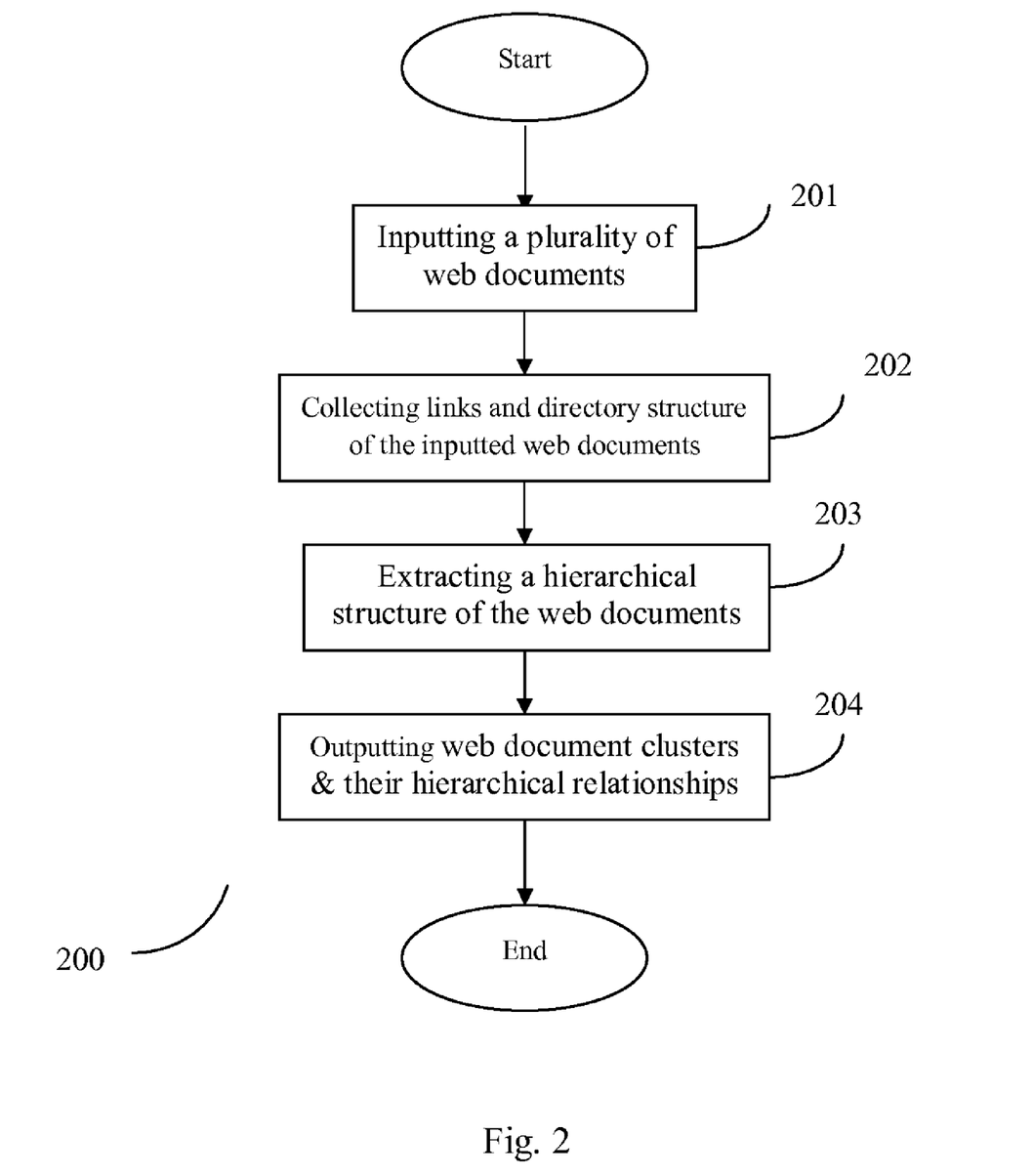
FIG. 2 is a flow chart diagram of an example of the operation 200 of the web document clustering system shown in FIG. 1.

Next will describe the operation process of the web document clustering system 100 shown in FIG. 1 with reference to FIG. 2. FIG. 2 is a flow chart diagram of an example of the operation 200 of the web document clustering system shown in FIG. 1. The process 200 begins with inputting a plurality of web documents through the inputting means 101 (step 201). Then, in step 202, the collecting means 102 collects information on the link relationship and the directory structure among these web documents. The collected information on the link relationship and the directory structure will be provided as direct source data to the extracting means 103 for the extraction of the hierarchical structure. After providing the collected information on the link relationship and the directory structure to the extracting means 103, in step 203, the extracting means 103 extracts the hierarchical structure for the whole collection of web documents, that is, analyzes the web documents to derive the ancestor-descendant relations among these web documents. Then in step 204, the outputting means 104 clusters the web documents using the hierarchical structure generated by the extracting means 103 and obtains the hierarchical relations among the generated clusters at the same time. Then, the process 200 ends.

As described above, the direct and explicit relation information of the web documents, including the hyperlink information and directory structure information, is direct source data required for extracting the hierarchical structure for the web documents and is regarded as the features of the hierarchical structure extraction. Therefore, it is an important preprocessing for the present invention to extract and collect from the inputted web documents the required hyperlink information and directory structure information, which will be described in more details below.

First, with respect to the directory structure of the web documents, it can be extracted by examining and obtaining the web server's hierarchical directory structure, which is exposed by the URLs of the web documents. For example, the document with URL http://www.abc.com/d is the parent of the document with URL http://www.abc.com/d/e.html in the directory structure. The implementation of directory structure information extraction is to perform a rule-based judgement for each pair of web documents' URLs. It is known that each URL can be regarded as comprising two parts: directory path and file name. For example, for a URL http://www.abc.com/d/e.html, the directory path is http://www.abc.com/d and the file name is e.html. In an example, we first regard the URL without file name as that the corresponding document is the index document of the directory path of the saying URL. Additionally, for those documents with special indicative file names such as index.*, default.*, home.*, etc., we also identify these documents as the index documents. Thus, we define the rules to identify that the document A is an ancestor of document B in the directory structure while A is an index document and A has the same directory or ancestor directory path as B. Extracted directory structure information of the set of web documents is set as a 2-tuple set {(ancestor, descendant)|ancestor, descendant are within the saying web document set, and ancestor is the ancestor of descendant in the directory structure}. It should be noted that the rules described above for defining the ancestor-descendant relations on the directory structure are only an example. It is easy to conceive for those skilled in the art to use other rules for extracting the ancestor-descendant relations among web documents based on the directory structure stored in the web server.

Because the directory structure information is hierarchical and thus already reflects part of the hierarchy information of the set of web documents, the task of the hierarchical structure extraction is to identify whether there is the ancestor-descendant relationship between those web document pairs without ancestor-descendant relations on the directory structure, i.e., to extract implicit hierarchy structure. In an embodiment, this can be achieved by analyzing the hyperlink relations among these web documents.

A hyperlink is a navigation link from one document, called origin document, to another document, named target document. The hyperlink implies the contextual or contentual connection between the origin document and the target document. The hyperlink extraction can be implemented through any technologies well-known in the prior arts, such as parsing each document's html source code and extracting the href values of every link HTML tags (<a>). Therefore, the extraction process of the hyperlink information is not introduced here repeatedly. Extracted hyperlink information of the set of the web documents is also set as a 2-tuple set {(origin, target) |origin, target are within the saying web document set, and there is at least one hyperlink from origin to target}.

Typically, if there is a group of web documents all of which are related to some subject, the links directed to this group from outside are linked to high-level documents much more than to low-level documents, while the link directed to those low-level documents of the group mostly come from the other documents inside the group. Based on this observation, we identify that the document A is the ancestor of the document B while the in-bound hyperlink set of the document B is a subset of the out-bound hyperlink set of the document A. It should be noted that the rules described above for defining ancestor-descendant relations on the hierarchical structure based on the hyperlink relations of the web documents are only an example. It is easy to conceive for those skilled in the art to use other rules for extracting the hierarchical structure based on the hyperlink relations of the web documents.

Based on the above description, a whole hierarchical structure for a set of web documents can be derived by combining the analysis results for the directory structure and the hyperlink relations of these web documents. The hierarchical structure can be used for representing the ancestor-descendant relations among the web documents in a web document set. For example, assuming S is a web document set, H(S) is the hierarchy structure of S, D is the directory structure on the S, $P_i$, $P_j$ are two web documents in the S, and $OUT_i(S)$, $IN_j(S)$ are the out-bound link set of $P_i$ and in-bound link set of $P_j$, respectively, then we can define the ancestor-descendant relations between $P_i$ and $P_j$ as follows:

$$(P_i, P_j) \in H(S) \Leftrightarrow ((P_i, P_j) \in D) \vee (OUT_i(S) \supseteq IN_j(S))$$

Figure 3:
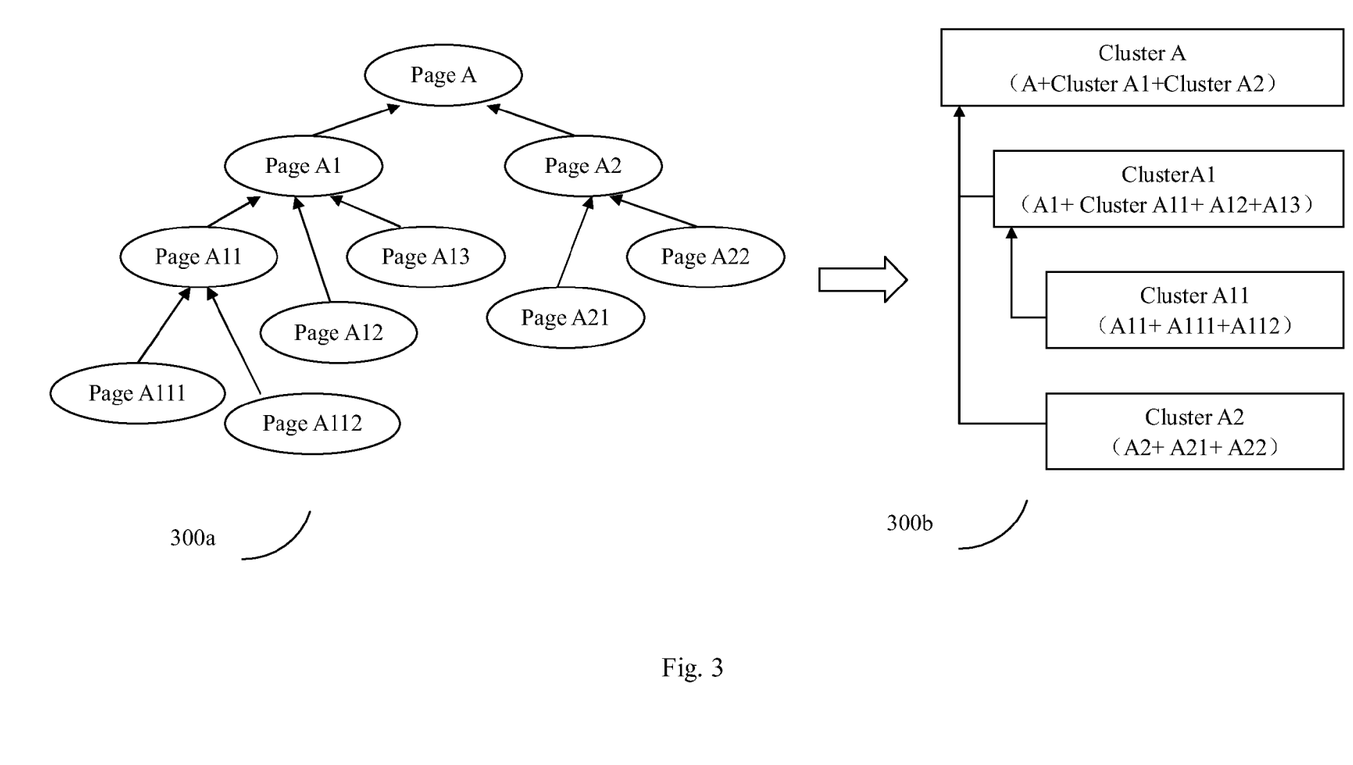
FIG. 3 is a schematic diagram for showing an example of performing the document clustering based on the hierarchical structure among web documents, wherein a web document hierarchical structure 300a and a cluster structure 300b generated based on that are shown.

As shown in FIG. 3, which shows an example of hierarchical structure 300a of web documents, such as web pages and a cluster structure 300b generated based on the hierarchical structure 300a. As shown, the hierarchical structure 300a of the web pages are organized in a tree, wherein the page A is an ancestor of pages A1 and A2, page A1 is an ancestor of pages A11, A12 and A13, page A2 is an ancestor of pages A21 and A22. In addition, page A11 is an ancestor of pages A111 and A112.

Return to FIG. 2, it is shown that after the hierarchical structure being extracted, the result can be directly used for web document clustering (step 204). Typically, each web document with its descendant web documents are all related to the same subject of some level, and then we can group them into a document cluster and the saying document is certainly the centric document of this cluster. For example, as shown in FIG. 3, page A11 and its descendant pages A111 and A112 can be organized into a cluster A11, and the page A11 is the centric page of the cluster A11. In turn, page A1 can be organized with cluster A11, pages A12 and A13 into another cluster A1 and so on. Thus, as shown by the cluster structure 300b of FIG. 3, the hierarchical structure of these centric documents brings out the hierarchical clustering results intuitively, and at the same time as the cluster structure obtained, the hierarchical relationships among these clusters are also acquired clearly. Additionally, the intermediate result, i.e., hierarchical structure of the web document set can also be regarded as the outgrowth for other information extraction-related tasks.

Figure 4:
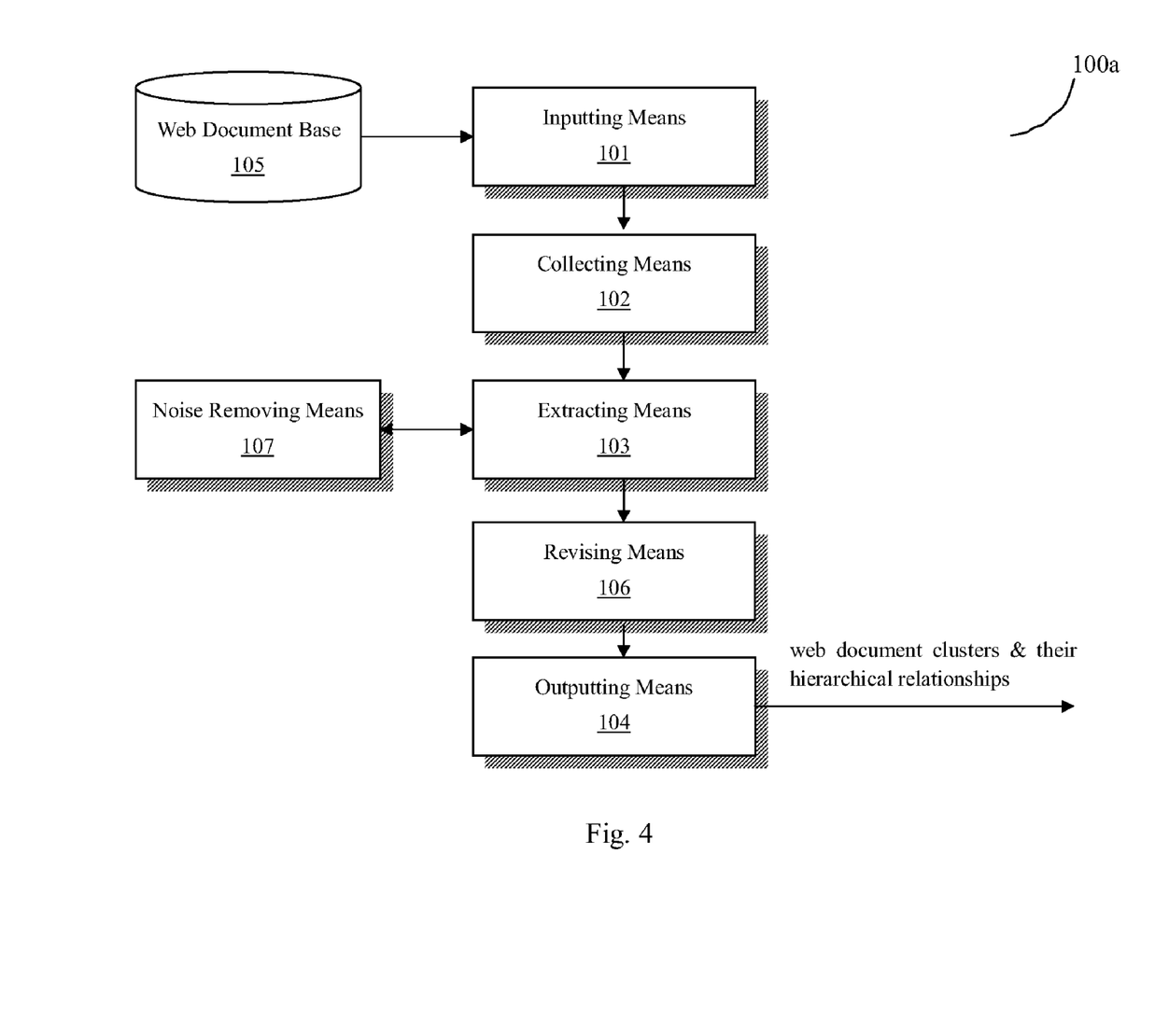
FIG. 4 is a block diagram for illustrating the web document clustering system 100a according to a second embodiment of the present invention.

FIG. 4 is a block diagram for illustrating the web document clustering system 100a according to a second embodiment of the present invention. Compared with the first embodiment shown in FIG. 1, the system 100a shown in FIG. 4 further comprises a revising means 106 and a noise removing means 107. The revising means 106 coupled between the extracting means 103 and the outputting means 104 is used for revising the hierarchical structure generated in the extracting means 103. The noise removing means 107 is also coupled to the extracting means 103, and is used for interacting with the extracting means 103 to remove link noises that may influence the accuracy of the hierarchical structure extraction during the process of extracting the hierarchical structure. The other components of the clustering system 100a are similar in functions to those in the system 100 shown in FIG. 1, and thus their detailed description is omitted here.

Figure 5:
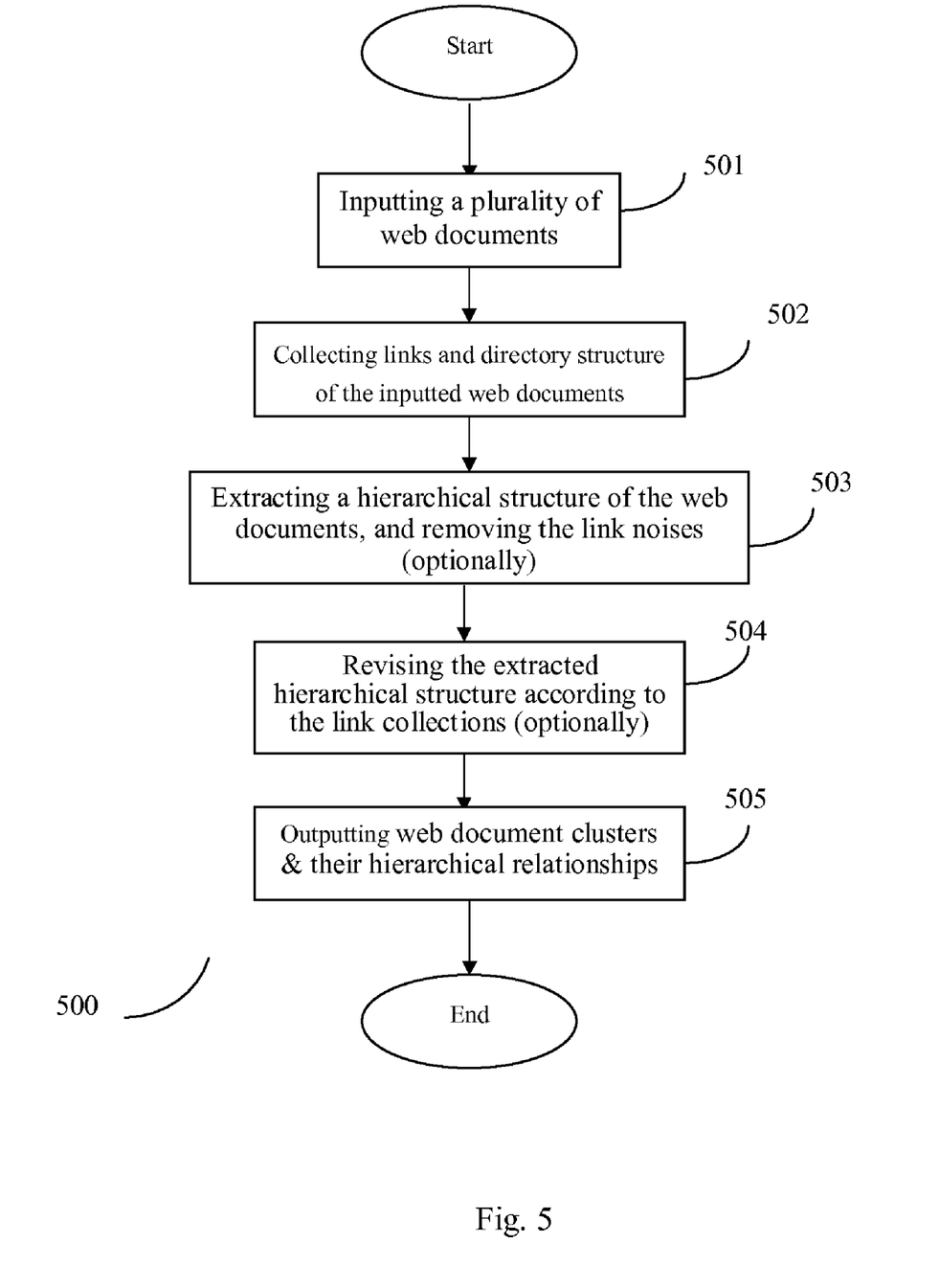
FIG. 5 is a flow chart diagram of an example of the operation 500 of the web document clustering system shown in FIG. 4.

FIG. 5 is a flow chart diagram of an example of the operation 500 of the web document clustering system 100a shown in FIG. 4. Similarly to the process of FIG. 2, the process 500 begins with inputting a plurality of web documents (step 501). In step 502, the hyperlink relations and the directory structure of the inputted web documents are extracted and collected. Then in step 503, based on the collected hyperlink relations and directory structure, a hierarchical structure of these web documents is extracted. Here, different from the first embodiment, during the hierarchical structure extraction process, the noise removing means 107 is added to remove the link noises. Here, the link noises denote the links returning to high-level documents from low-level documents for facilitating the checkup of the web documents in most of the actual websites. In an example, the extraction of the hierarchical structure of web documents is an iterative convergence process. The noise removing means 107 can remove link noises by removing from the obtained hyperlink relations all of the opposite links from descendants to ancestors each time a midway hierarchical structure is extracted. The improved hyperlink relations are then used for the extraction of the next hierarchical structure until the final hierarchical structure is unchanged any longer (i.e. convergence). However, the present invention is not limited to the example described herein. It can be conceived for those skilled in the art that other appropriate methods can be used to remove the link noises in the hyperlink relations.

Although the link noises that may exist in the hierarchical structure have been removed, in the actual web, there may exist some unreasonable or error hyperlinks. Therefore, the final clusters may include more or less errors. In order to obtain more correct clustering result, the hierarchical structure that has removed the link noises is provided to the revising means 106 for further revising the hierarchical structure (step 504). In the embodiment, the revising of the hierarchical structure is performed based on the link collection. However, the process for revising the hierarchical structure is not limited to the example described herein. It is easy for those skilled in the art to conceive other methods for revising the hierarchical structure.

Link collection means a set of links with the same layout and presentation properties within one document, which usually represents one of semantic blocks of the document. In general, the destination of the links within the same link collection might be at the same semantic hierarchy level, i.e. could be clustered from the document author's viewpoint. Based on this assumption, we can revise out automatically generated hierarchical clustering results by complementing the links in the same link collection that are not present in the hierarchical structure.

Figure 6:
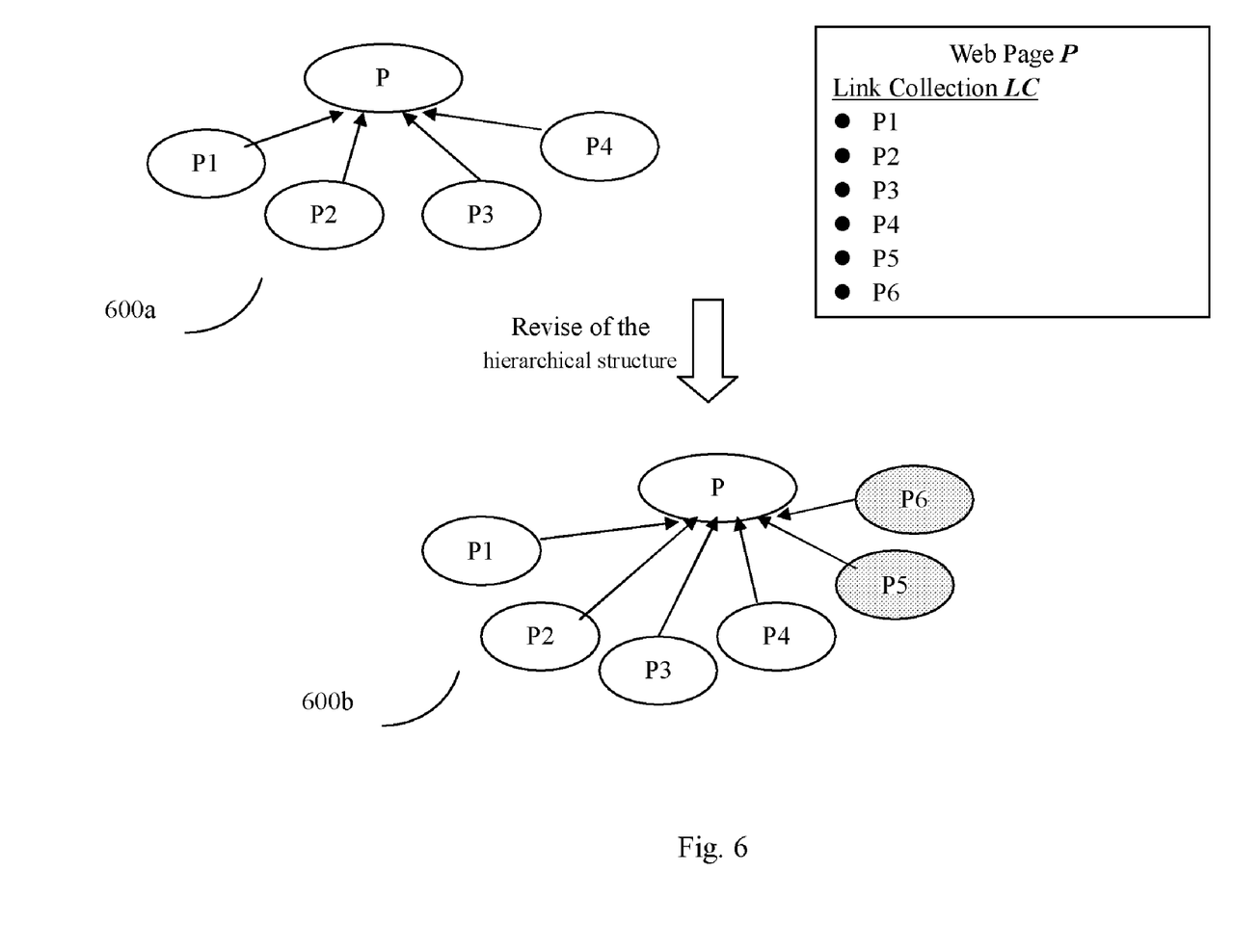
FIG. 6 is a schematic diagram for showing an example of a process for revising the hierarchical structure according to link collection.

For example, as shown in FIG. 6, which shows an example of a process for revising the hierarchical structure according to link collection. It is assumed that the extracting means extracts a hierarchical structure 600a, wherein page P is the parent (direct ancestor) of pages P1, P2, P3 and P4 in the tree structure, and pages P1, P2, P3 and P4 form a set Son(P). For each document P and its children (direct descendant) documents, if P has a link collection LC most destinations of which are inside Son(P), we consider the other destinations of LC should also be the sons of P then we complement them into the hierarchical structure. As shown in FIG. 6, the link collection of page P includes pages P1, P2, P3, P4, P5 and P6. Since pages P1, P2, P3 and P4 have been identified as the sons of page P in the hierarchical structure, pages P5 and P6 are also regarded as the sons of page P and complemented into the hierarchical structure 600*a* to generate a revised hierarchical structure 600*b*, as shown in FIG. 6. Please note that the revising process shown in FIG. 6 is only an example, and the present invention is not limited to this specific example.

Return to FIG. 5, after revising the hierarchical structure, in step 505, the revised hierarchical structure is used for clustering of the web documents. Then, the final clusters of the web documents and the hierarchical relations among these clusters can be achieved. Then, the process 500 ends.

The foregoing description is related to the first and second embodiments of the present invention. Below an application example of the present invention will be given with reference to FIG. 7. In the example, the present invention is used for implementing the clustering of the products-related web pages in a company website to extract the products and their profile information from the company website accurately and efficiently.

Figure 7:
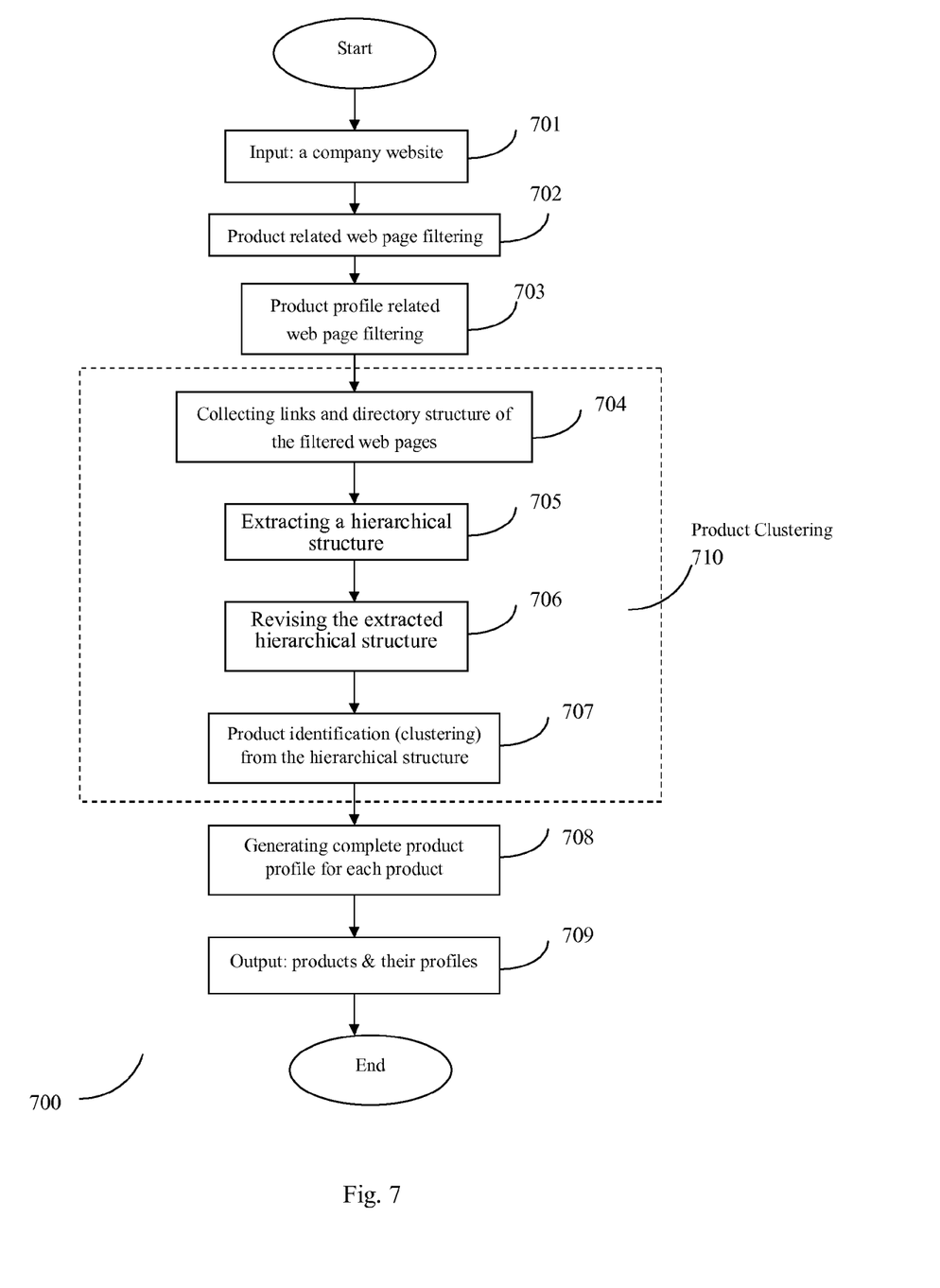
FIG. 7 shows an application example of the present invention, which is used for implementing the web document clustering related to the products in a certain company website.

The process 700 begins with the input of a company website (step 701). Then, in step 702, the web pages in the website are first filtered to remain only the possible product-related web pages, i.e. to omit the unrelated pages such as company introduction or news, etc. In step 703, the remaining web pages are further filtered to remain only the possible product profile related pages, i.e. to distinguish those obvious product related pages without profile information, such as the product list pages. These two filtering processes can be implemented by any existing solutions such as keyword based filtering methods. Obviously, it is helpful for the accuracy and efficiency of the following product clustering by preventing the noise information from being introduced into the clustering in advance.

Next, with respect to the subset of web pages related to the product profile information, the method of the present invention is used to perform clustering of the product-related documents, i.e. step 701, which includes sub-steps 704-707 corresponding to the steps in the second embodiments of the present invention as shown in FIG. 5. First, in step 704, the hyperlink relations and directory structure of the filtered subset of web pages are extracted and collected. Here, different from the second embodiment, the in-bound links and out-bound links for each web page are not limited to be close within the profile-related pages subset, while the sources of in-bound links and destinations of out-bound links can be extended to the whole set of the product-related pages, namely, the output of step 702. Such customization of this step is to further improve the accuracy of the pages clustering due to the consideration that all the product-related documents except the profile-related documents themselves could give the clues for product clustering. Then in step 705, the hierarchical structure of the subset of profile-based web pages could be extracted with the totally same process as that shown in FIG. 5. In step 706, the extracted hierarchical structure is revised. Here, different from the second embodiment, the top level of the hierarchical structure can also be revised because the whole company website is used to find the link collections most destinations of which are the top-level documents. Therefore, not only the errors which come from the hierarchical structure extraction but also that from the document filtering process can be revised, and thereby the accuracy of the web pages clustering is further improved. Then, in step 707, the revised hierarchical structure is used for product-related web pages identification (clustering). Because the subset of the web pages that is used for clustering only includes the profile-related pages, each page on the top level of the hierarchical structure should represent one product, and all the descendants of this page constitute the complete profile of this product.

Next, after completing the clustering of the product-related web pages, we can combine the information from all the profile pages of each product to get the complete product profile (step 708). In step 709, the clustering result and its complete profile are outputted. Then, the process 700 ends. The foregoing is related to one of application examples of the present invention. However, it is easy to understand that the present invention is not limited to the specific application. Those skilled in the art can conceive the application of the present invention to other network information identification, clustering and analysis applications.

The foregoing description is to describe the system and method of web documents clustering according to the first and second embodiments of the present invention. With the extraction of the hierarchical structure of the web documents, the clustering method of the present invention can not only implement the clusters of the web documents, but can obtain the hierarchical relations among the generated clusters automatically as well.

Furthermore, considering that the present invention utilizes the including relationships between in-bound and out-bound link sets as feature to perform the documents clustering, it can reduce the disturbance of the random or non-meaningful hyper-link information, so that it can improve the accuracy of the clustering results greatly. On the other hand, the usage of the feature is not learning-based but simple rule-based, so that the satisfied efficiency can be obtained.

Furthermore, since the clustering results according to the present invention include not only clusters but also the hierarchical relations between clusters additionally, this method can get the clustering results of different similarity levels at the same time, and they are co-related. Thus it improves the efficiency on the whole.

The specific embodiments of the present invention have been described above with reference to the accompanying drawings. However, the present invention is not limited to the particular configuration and processing shown in the accompanying drawings. Furthermore, for the purpose of simplification, the description for those well-known methods or technologies is omitted here. In the embodiments, several specific steps are shown and described as examples. However, the method process of the present invention is not limited to these specific steps. Those skilled in the art will appreciate that these steps can be changed, modified and complemented or the order of some steps can be changed without departing from the spirit and substantive features of the invention.

The elements of the invention may be implemented in hardware, software, firmware or a combination thereof and utilized in systems, subsystems, components or sub-components thereof, When implemented in software, the elements of the invention are programs or the code segments used to perform the necessary tasks. The program or code segments can be stored in a machine-readable medium or transmitted by a data signal embodied in a carrier wave over a transmission medium or communication link. The "machine-readable medium" may include any medium that can store or transfer information. Examples of a machine-readable medium include electronic circuit, semiconductor memory device, ROM, flash memory, erasable ROM (EROM), floppy diskette, CD-ROM, optical disk, hard disk, fiber optic medium, radio frequency (RF) link, etc. The code segments may be downloaded via computer networks such as the Internet, Intranet, etc.

Although the invention has been described above with reference to particular embodiments, the invention is not limited to the above particular embodiments and the specific configurations shown in the drawings. For example, some components shown may be combined with each other as one component, or one component may be divided into several subcomponents, or any other known component may be added. The operation processes are also not limited to those shown in the examples. Those skilled in the art will appreciate that the invention may be implemented in other particular forms without departing from the spirit and substantive features of the invention. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for web documents clustering, comprising:
inputting a plurality of web documents;
collecting link information and directory structure information of the inputted web documents;
extracting, by a processor, according to the collected link information and directory structure information, a hierarchical structure for the plurality of web documents;
after extracting the hierarchical structure, revising the extracted hierarchical structure by analyzing the link information in the inputted web documents; and
generating and outputting, based on the extracted hierarchical structure, plurality of clusters of the plurality of web documents,
wherein the directory structure information is extracted by comparing directory paths of the web documents, wherein the directory paths include information about a location in a web server where each of the plurality of web documents are stored, and the extracted hierarchical structure corresponds to ancestor-descendent relationship structure of the plurality of web documents,
wherein the plurality of web documents are grouped into the plurality of clusters according to the extracted hierarchical structure such that a first web document of the plurality of web documents and descendent web documents of the first web documents are grouped as a first cluster of the plurality of clusters, and a second web document of the plurality of web documents and descendent web documents of the second web documents are grouped as a second cluster of the plurality of clusters, and
wherein the first and the second clusters have an ancestor-descendent relationship between each other corresponding to the extracted hierarchal structure.

2. The method according to claim 1, further comprising:
outputting hierarchical relationships of the generated web document clusters.

3. The method according to claim 1, wherein extracting the hierarchical structure comprises:
determining a first hierarchical structure according to the collected directory structure information;
determining a second hierarchical structure according to the collected link information of the web documents; and
combining the first hierarchical structure and the second hierarchical structure to determine the extracted hierarchical structure.

4. The method according to claim 3, wherein:
a first ancestor-descendant relationship in the first hierarchical structure is determined by analyzing the collected directory structure information, wherein a first web document among the web documents is determined as an ancestor of a second web document among the web documents, if the first web document is an index document and has a same directory path as the second web document; and
a second ancestor-descendant relationship in the second hierarchical structure is determined by comparing the collected link information between the web documents, wherein a third web document among the web documents is determined as an ancestor of a fourth web document among the web documents, if an in-bound links set of the fourth web document is a subset of an out-bound links set of the third web document.

5. The method according to claim 1, further comprising during the process of extracting the hierarchical structure, removing link noises in the collected link information.

6. The method according to claim 1, wherein each cluster includes a center web document and web documents, which are descendants of the center web document in the hierarchical structure.

7. The method according to claim 1, wherein the directory structure information is extracted by examining and obtaining a web server's hierarchical directory structure.

8. The method according to claim 1, wherein the link information includes information about a navigation link from one web document among the plurality of web documents to another web document among the plurality of web documents.

9. The method according to claim 1, wherein the directory structure information is obtained from an Uniform Resource Locator (URL) of each of the plurality of web documents.

10. The method according to claim 1, wherein the directory structure information includes information about a path and a file name.

11. A system for web documents clustering, comprising:
an inputting means for inputting a plurality of web documents;
a collecting means for collecting link information and directory structure information of the inputted web documents;
an extracting means for extracting, implemented by a processor, according to the collected link information and directory structure information, a hierarchical structure for the plurality of web documents;
a revising means coupled between the extracting means and the outputting means for after extracting the hierarchical structure by the extracting means, revising the extracted hierarchical structure by analyzing the collected link information in the inputted web documents; and
an outputting means for generating and outputting, based on the extracted hierarchical structure, plurality of clusters of the plurality of web documents,
wherein the directory structure information is extracted by comparing directory paths of the web documents, wherein the directory paths include information about a location in a web server where each of the plurality of web documents are stored, and the extracted hierarchical structure corresponds to ancestor-descendent relationship structure of the plurality of web documents,
wherein the plurality of web documents are grouped into the plurality of clusters according to the extracted hierarchical structure such that a first web document of the plurality of web documents and descendent web documents of the first web documents are grouped as a first cluster of the plurality of clusters, and a second web document of the plurality of web documents and descendent web documents of the second web documents are grouped as a second cluster of the plurality of clusters, and wherein the first and the second clusters have an ancestor-descendent relationship between each other corresponding to the extracted hierarchal structure.

12. The system according to claim 11, wherein the outputting means also outputs hierarchical relationships of the generated web document clusters.

13. The system according to claim 11, wherein the extracting means is configured for:

determining a first hierarchical structure according to the collected directory structure information;

determining a second hierarchical structure according to the collected link information of the web documents; and combining the first hierarchical structure and the second hierarchical structure to determine the hierarchical structure.

14. The system according to claim 13, wherein:

a first ancestor-descendant relationship in the first hierarchical structure is determined by analyzing the collected directory structure information, wherein a first web document among the web documents is determined as an ancestor of a second web document among the web documents, if the first web document is an index document and has a same directory path as the second web document; and a second ancestor descendant relationship in the second hierarchical structure is determined by comparing the collected link information between the web documents, wherein a third web document among the web documents is determined as an ancestor of a fourth web document among the web documents, if an in-bound links set of the fourth web document is a subset of an out-bound links set of the third web document.

15. The system according to claim 11, further comprising:

a noise removing means coupled to the extracting means for during the process of extracting the hierarchical structure by the extracting means, removing link noises in the collected link information.

16. The system according to claim 11, wherein each cluster includes a center web document and web documents, which are descendants of the center web document in the hierarchical structure.

17. The system according to claim 11, wherein the directory structure information is extracted by examining and obtaining a web server's hierarchical directory structure.

18. The system according to claim 11, wherein the link information includes information about a navigation link from one web document among the plurality of web documents to another web document among the plurality of web documents.

19. The system according to claim 11, wherein the directory structure information is obtained from an Uniform Resource Locator (URL) of each of the plurality of web documents.

20. The system according to claim 11, wherein the directory structure information includes information about a path and a file name.

\* \* \* \* \*